Nov. 5, 1963  J. R. URSCHEL ETAL  3,109,469
GREEN BEAN FEEDING AND ORIENTATING DEVICE
Original Filed July 19, 1956  7 Sheets-Sheet 1
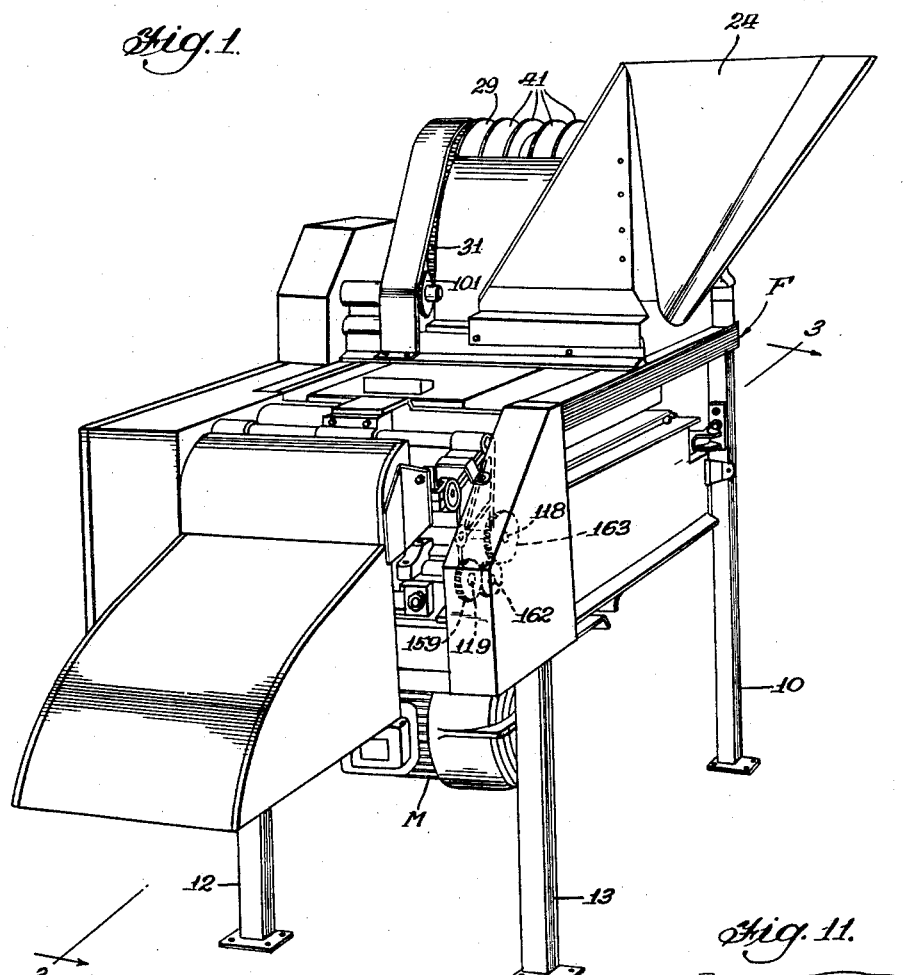
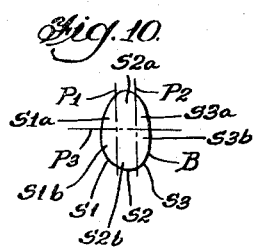
INVENTORS.
Joe R. Urschel and
Gerald W. Urschel

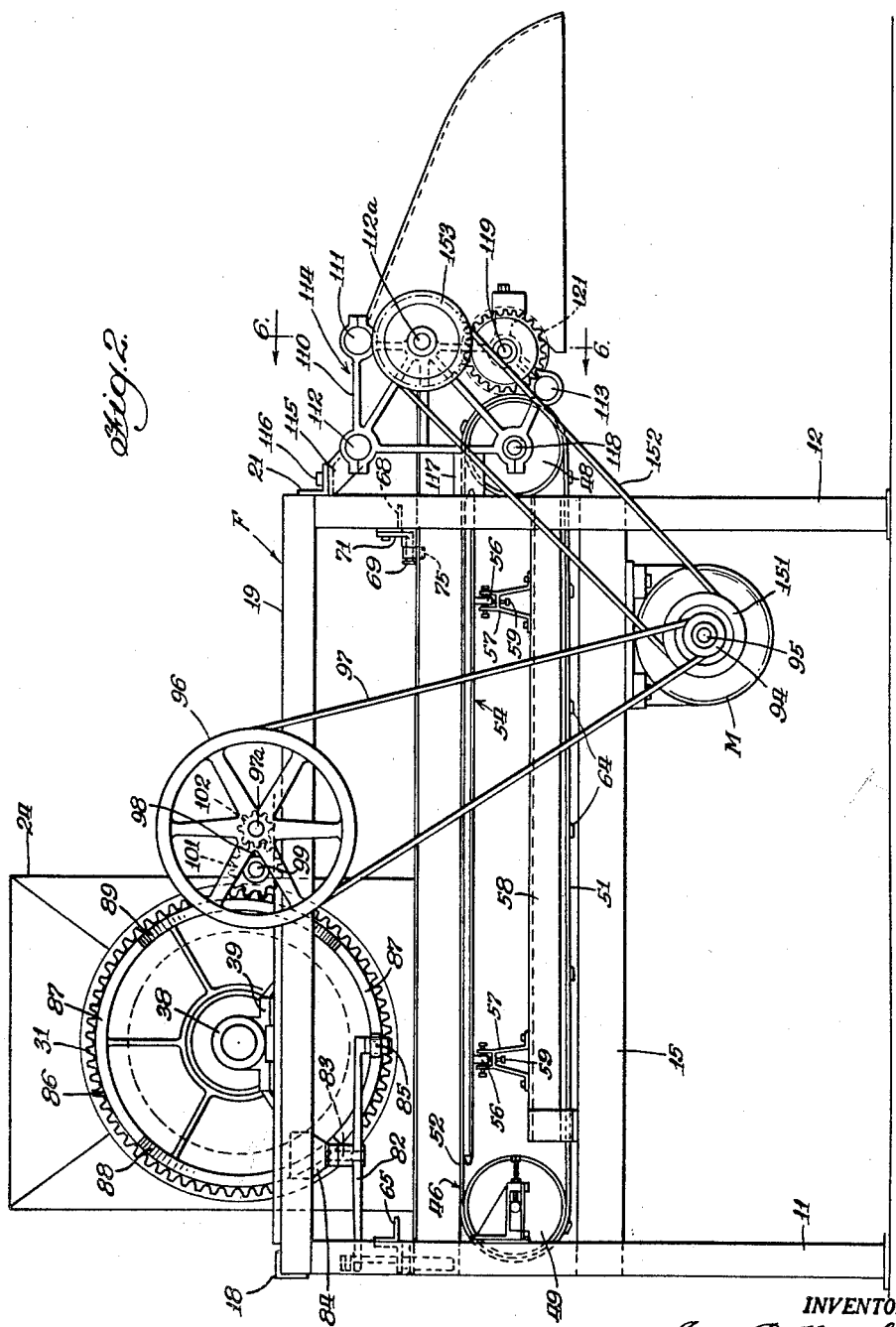

Nov. 5, 1963          J. R. URSCHEL ETAL          3,109,469
GREEN BEAN FEEDING AND ORIENTATING DEVICE
Original Filed July 19, 1956                    7 Sheets-Sheet 3
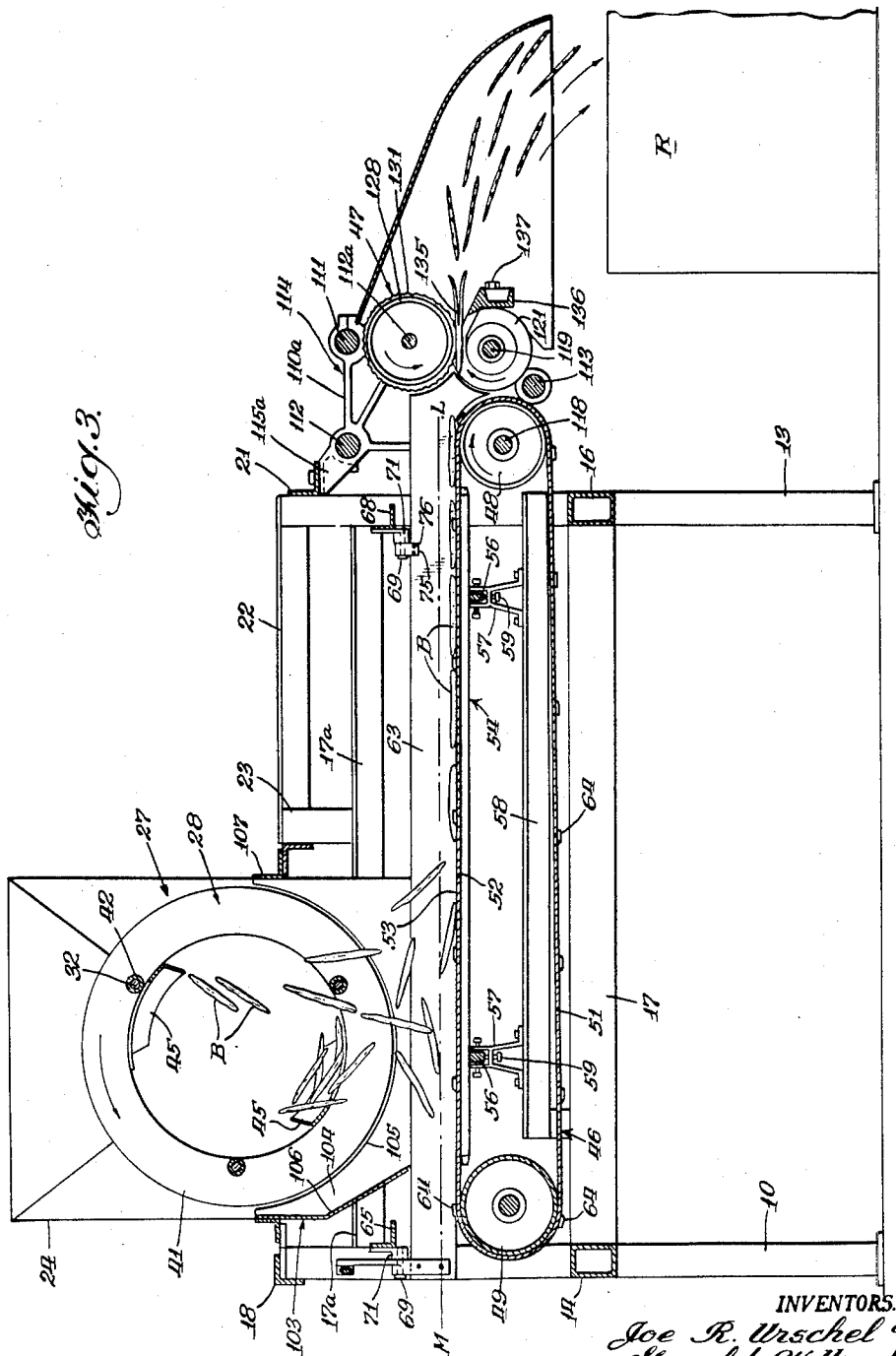
INVENTORS.
Joe R. Urschel and
Gerald W. Urschel
Atty.

Nov. 5, 1963   J. R. URSCHEL ETAL   3,109,469
GREEN BEAN FEEDING AND ORIENTATING DEVICE
Original Filed July 19, 1956   7 Sheets-Sheet 4

INVENTORS.
Joe R. Urschel and
Gerald W. Urschel

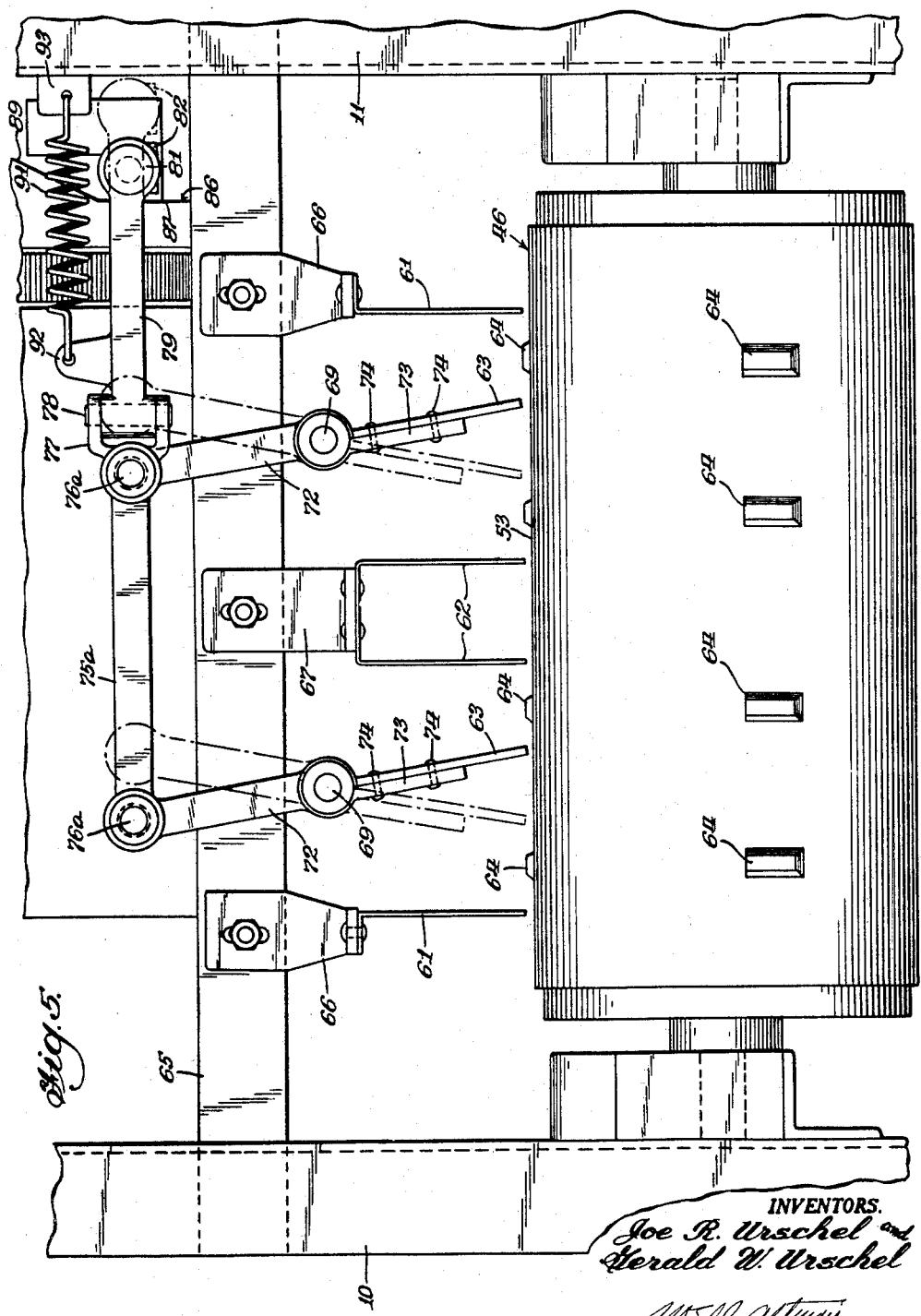

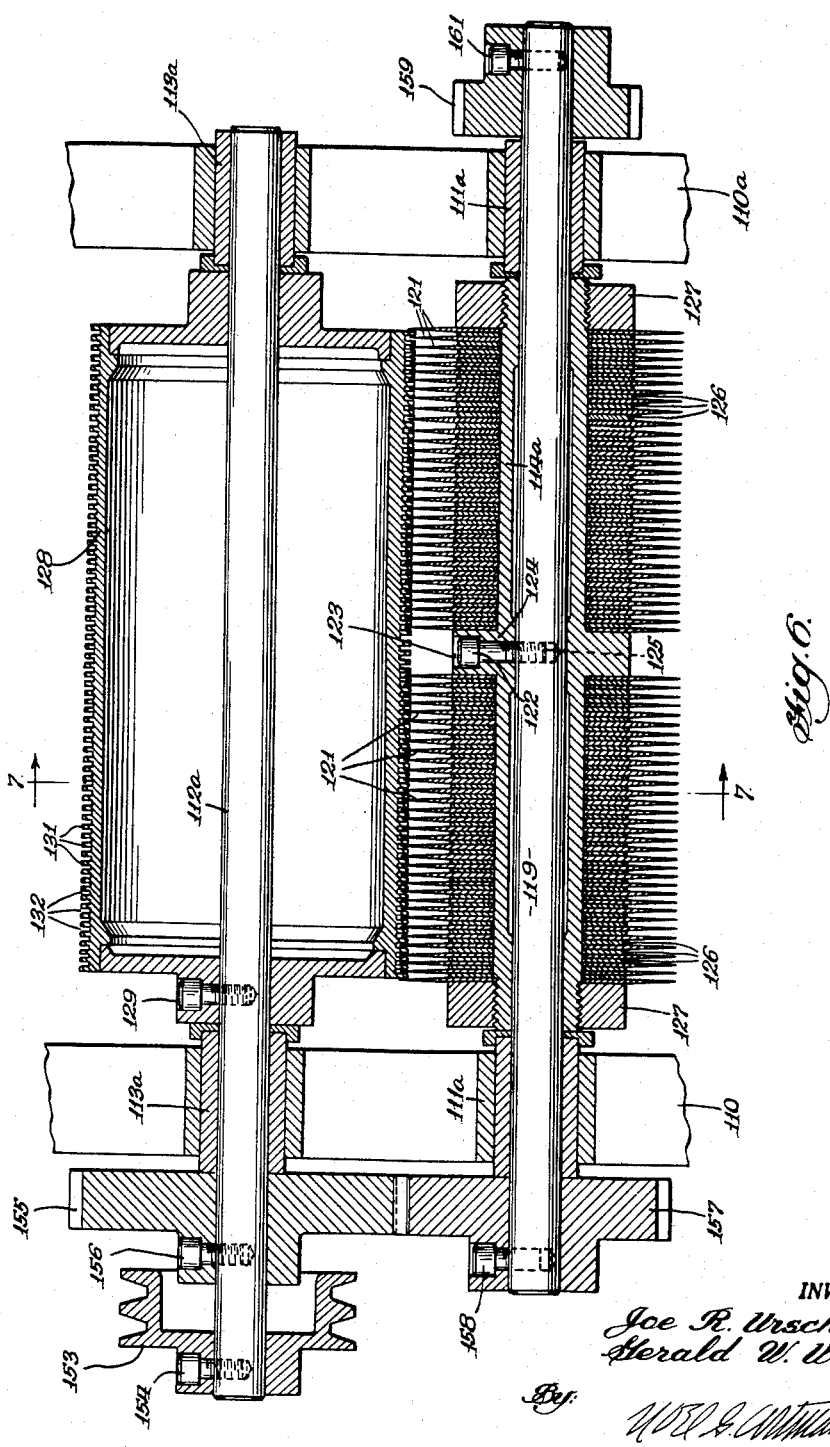

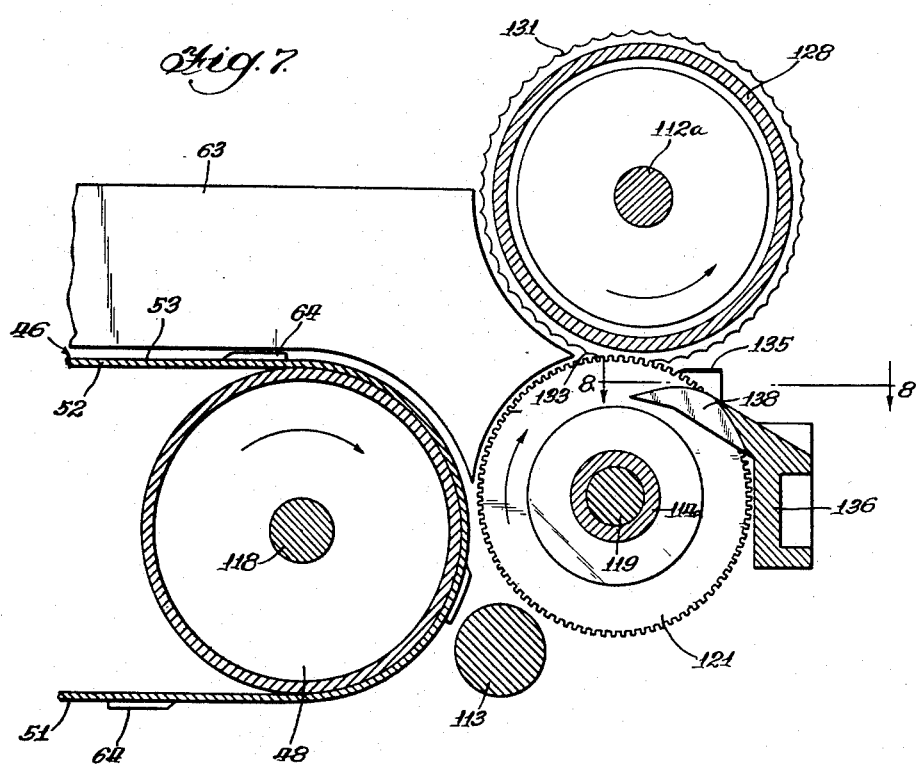

United States Patent Office 3,109,469
Patented Nov. 5, 1963

3,109,469
GREEN BEAN FEEDING AND ORIENTATING DEVICE
Joe R. Urschel and Gerald W. Urschel, % Urschel Laboratories, Inc., Valparaiso, Ind.
Original application July 19, 1956, Ser. No. 598,882, now Patent No. 3,053,296, dated Sept. 11, 1962. Divided and this application Nov. 28, 1961, Ser. No. 155,289
15 Claims. (Cl. 146—78)

This invention relates to machines for dividing elongated cuttable articles lengthwise into separate strips and more particularly concerns machines adapted for feeding and orienting green or wax beans or other elongated eatable pods to be delivered endwise into mechanism for slitting them into strips. This application is a division of our co-pending application titled Bean Slitting Machine, filed July 19, 1956, under Serial No. 598,882 which issued into Patent No. 3,053,296 on September 11, 1962.

Bean slitting machines heretofore used in the canning industry have made longitudinal cuts in parallel planes through the beans. Consumer acceptance of this product is influenced by appearance, and processors consider it an improvement in appearance and quality for as high a percentage as possible of the strips slit from the beans to have a length approaching that of the bean from which they are cut and to have uniform width throughout most of their length. Short slivers and wedges lower the product value. To attain a better product according to this criterion the majority of canners have resorted to slitting only flat beans, despite the preference of many consumers for the texture and flavor of beans which are round in cross-section, which have a tendency to lie flat so conventional machines can make parallel cuts through a higher percentage of the flat sides. However a certain portion of the flat beans stand on edge while being sliced so the knives pass through these beans parallel with the flat sides, causing the beans to be cut in wide slabs. These slab particles of course greatly deteriorate the appearance of the product.

An important object of this invention is the provision of an improved bean slitting machine operable to cut the beans lengthwise in a plurality of laterally spaced parallel planes and to also cut the beans lengthwise in a plane at right angles to the first planes, thus adapting the machine to make exceedingly slender strips from green beans irrespective of whether they are flat or round.

A more specific object is the provision of a bean slitting mechanism adapted to endwise advance string beans while making a plurality of slit-forming cuts therethrough in parallel planes extending lengthwise through the beans, and having a slitting knife extending at right angles to the first planes to further slit the first-formed strips into additional narrower strips.

The objects of this invention also include the step of first lengthwise cutting a bean in a plurality of parallel planes followed by the step of simultaneously slitting the first-cut strips along a plane at right angles to the parallel planes.

A further object is the provision of an improved bean feeding means in the form of a cylinder rotatable about a substantially horizontal axis for tumbling beans about the interior thereof and having cylindrical side walls made up of annular plates spaced apart axially of the cylinder to form side wall openings therebetween through which the beans are dischargeable only when arranged substantially perpendicularly to the prinicipal axis of the cylinder.

Still another object is the provision of bean conveyor troughs disposed beneath the cylinder according to the preceding object and directed perpendicularly to the axis of such cylinder respectively beneath the openings between the annular plates or ribs of such cylinder to facilitate the reception of the beans lengthwise into the troughs as they are discharged from the cylinder.

A further object is the provision of a bean slicing machine wherein there is a conveyor trough having side walls projecting upwardly from a conveyor surface forming the bottom of the trough and movable lengthwise thereof, and wherein the longitudinal walls of the trough are transversally relatively movable for engaging the beans therein and arranging them substantially parallel with the line of movement of the conveyor surface.

Still a further object is the provision of an improved bean slitting means comprising a cylindrical bank of disk knives axially spaced and forming a bite with a cooperating roller and into which beans that are endwise fed are slittable endwise by the knives and the roller as they pass through the bite, and a knife disposed within a plane parallel with the bite and in position to register with the slit bean strips as they issue from the bite to further slit them in a plane perpendicular to the planes in which they were cut by the disk knives.

The above and other desirable objects inherent in and encompassed by the invention are elucidated in the ensuing description the appended claims and the annexed drawings, wherein:

FIG. 1 is a perspective view of a machine constituting a preferred embodiment of the invention.

FIG. 2 is a side elevational view of the machine shown in FIG. 1.

FIG. 3 is an elevational sectional view taken longitudinally through the machine at the plane indicated by the line 3—3 in FIGS. 1 and 4, and includes an elevational view of a receptacle for the finished product discharged from the machine.

FIG. 5 is a fragmentary end elevational view of the machine taken to an enlarged scale for illustrating conveyor troughs together with means for moving movable walls of these troughs.

FIG. 6 is a vertical sectional view taken to an enlarged scale at the plane indicated by the line 6—6 in FIG. 2, illustrating a bank of disk slitting knives and a companion roller cooperable therewith for affecting endwise slits through beans as they advance endwise through the bite formed between these knives and the roller.

FIG. 7 is a fragmentary sectional view taken at a plane coinciding with the line 7—7 of FIG. 6.

FIG. 8 is a horizontal view taken at the line 8—8 of FIG. 7 to illustrate the mounting of the knife for endwise slitting the beans in a plane perpendicularly to the planes of the disk knives as the beans emerge from the bite between the disk knives and the companion slitting roller.

FIG. 9 is a plan view of a bean traversed endwise by laterally spaced dot-dash lines marking the position of parallel planes at which the disk knives of the machine typically would cut the bean.

FIG. 10 is a view taken at the line 10—10 of FIG. 9 illustrating by vertical dot-dash lines the laterally spaced planes at which the disk knives would cut the bean and also illustrating by a horizontal dot-dash line the plane at which the bean is further split by the knife shown in FIGS. 3, 7 and 8 as the beans emerge from the bite between the disk knives and the companion roller.

FIG. 11 is a perspective view of a bean fragment to illustrate the condition when a bean is first cut by the disk knives in planes parallel to the minor transverse axis of the bean and subsequently cut by the single knife at a plane substantially coinciding with the major axis of the transverse section of the bean.

Figure 4:
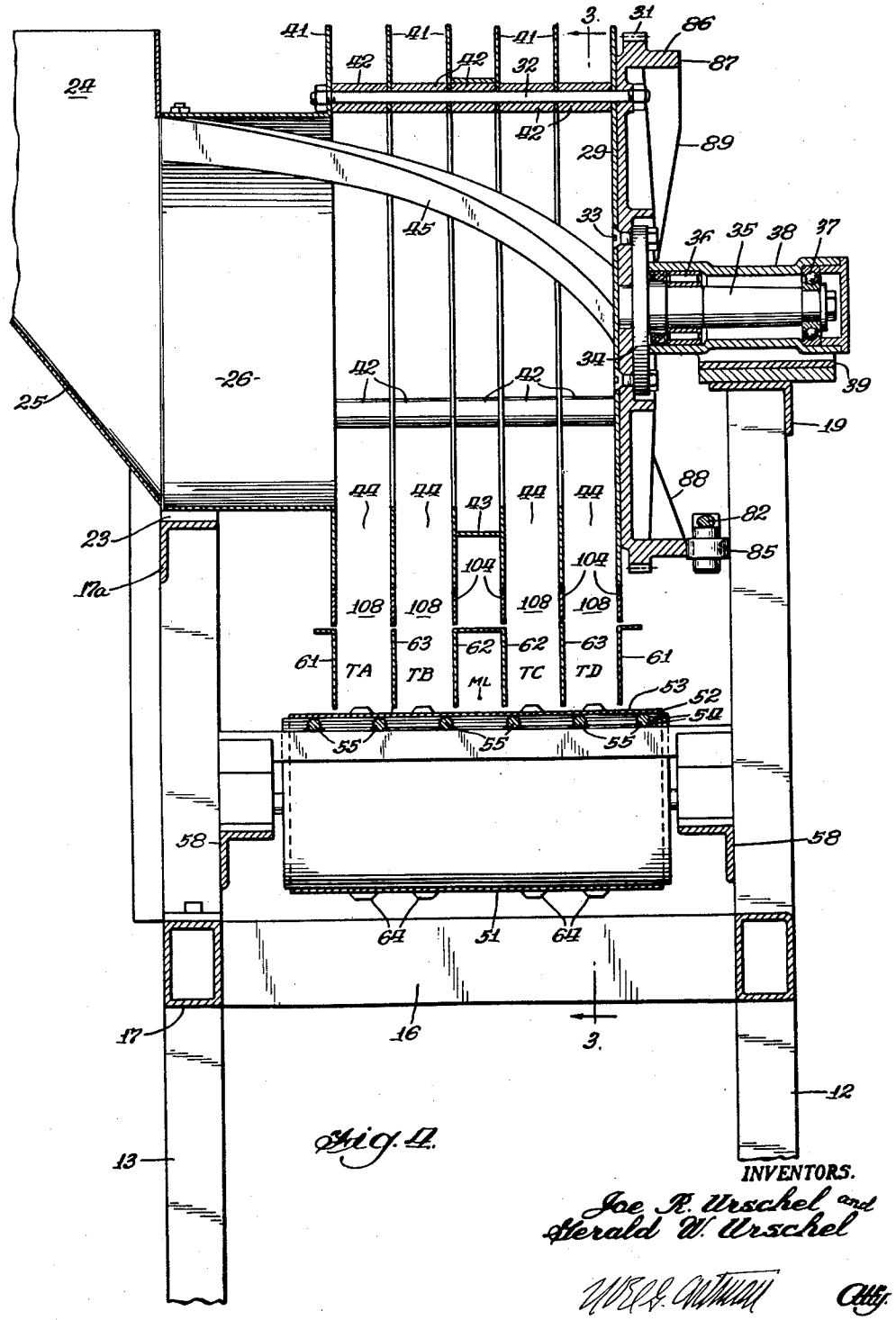
FIG. 4 is a vertical sectional view to an enlarged scale taken axially through a bean feeding cylinder of the machine, and with a portion of a hopper from which beans are fed into the cylinder being broken away.

With continued reference to the drawings and particularly to FIGS. 1 through 4, the machine can be seen to comprise a skeleton frame F having four upright legs 10, 11, 12 and 13 at respective corners of the frame. Legs 10 and 11 are at the feeding end of the machine whereas 12 and 13 are at the discharge end thereof, and legs 10 and 13 are at the front side of the machine and legs 11 and 12 are at the rear side thereof. Midway from bottom to top the legs 10 and 11 are joined by a square sectioned tubular cross member 14 whereas the legs 11 and 12 are joined by a similar cross member 15, legs 12 and 13 by a similar cross member 16 and the legs 10 and 13 by a similar cross member 17. Legs 10 and 11 are joined at their upper ends by an angle frame member 18 whereas the legs 11 and 12 are joined at their upper ends by an angle frame member 19, the legs 12 and 13 by an angle frame member 21. An angle frame member 22, FIG. 3, joins the upper end of the leg 13 with the upper end of a vertical frame member 23 of which the lower end is mounted upon a horizontal cross member 17a connected between legs 10 and 13; see FIGS. 3 and 4.

String beans which are to be operated upon by the machine are deposited in a hopper 24 having a sloping bottom wall 25 which directs the beans downwardly and horizontally into a cylindrical vestibule 26 of a bean feeding means 27 comprising a cylinder 28. The cylinder 28 has a disk end plate 29 having a gear 31 secured upon its outer side by a plurality of bolts 32 near the perimeter of the plate and by a plurality of bolts 33 near the center of the plate. Bolts 33 also secure a flange 34 of a spindle 35 to the plate 29 and to the gear 31. This spindle 35 which is coaxial with the cylinder is journalled in antifriction bearing units 36 and 37 which are carried in a tubular portion 38 of a bearing bracket 39 mounted upon the horizontal machine frame member 19. In addition to the end plate 29, the bean feeding cylinder 28 comprises axially spaced circumscribing ribs in the form of annular plates 41 mounted on the bolts 32 and held in spaced relation by spacer sleeves 42 strung upon such bolts. A cylindrical reinforcing member 43 is disposed between the innermost annular members 41. Annular ribs 41 are spaced apart less distantly than the length of the beans to be operated upon by the machine so the beans are dischargeable from the feeding cylinder 28 only when their axes are arranged substantially perpendicularly to the principal axis of the cylinder. These discharged spaces between the annular ribs 41 are designated 44 in FIG. 4.

Power transmitted to the feeding cylinder 28 by way of the gear 31 causes rotation thereof counter-clockwise as viewed in FIG. 3 and during this rotation of the cylinder spiral impeller members 45 carry the beans part way up the rising side of the cylinder and allow them to drop to the bottom of the cylinder and during this process causes the beans to be advanced from the vestibule 26 inwardly for distribution throughout the length of the cylinder.

Conveyor means in the form of a belt 46 is for transferring the beans from the bean feeding means 27 to bean slitting means 47, FIG. 3, at the product end of the machine. This endless conveyor belt 46 which is carried by a driving roller 48 at the product discharge end of the machine and by an idler roller 49 at the feed end of the machine, has a lower flight 51 and an upper flight 52 of which the upper surface 53 constitutes a bean supporting and transfer surface. This upper flight 52 of the belt is supported against sag by a frame 54 comprising a plurality of straight rods 55 which extend lengthwise of the upper belt flight 52 in engagement with the under side thereof, and a pair of transverse members 56 extending transversely of the rods and supported in brackets 57 mounted on angle iron frame members 58 extending longitudinally of the machine; see FIGS. 2, 3 and 4. Set screws 59 in the brackets 57 are in direct support of the frame bars 56 and are rotatable for leveling and adjusting the height of the belt flight supporting frame 54.

Immediately above the upper flight of the belt 46 are a plurality of longitudinally extending conveyor trough walls, the outer of which, FIG. 4, are designated 61, the inner of which are designated 62, and intermediate walls between each set of walls 61 and 62 are each designated 63. These conveyor trough walls cooperate with the upper flight of the belt in forming respective conveyor troughs TA, TB, TC and TD. These troughs extend from beneath the bean feeding means 27 the entire distance to the bean slitting means 47 as is ascertainable from FIG. 3. The conveyor belt has four rows of lugs 64 projecting outwardly from its outer periphery, the lugs being spaced apart slightly in excess of the length of the beans to be operated on by the machine and the rows respectively aligning with the troughs TA, TB, TC and TD for catching against beans deposited in these troughs and to facilitate the belt accelerating the beans up to the belt speed. During rotation of the belt 46, the bean supporting and transfer surface 53 thereof moves lengthwise of a median line ML shown longitudinally in FIG. 3 and appearing as a point in FIG. 4 between the conveyor trough walls 62.

At the feeding end of the machine the walls 61 are rigidly supported from a transverse frame member 65 by means of respective adjustable brackets 66; see FIGS. 2 and 5. The center trough walls 62 are supported from the transverse frame member 65 by an adjustable bracket 67. Brackets similar to the brackets 66 and 67 are employed at the product discharge end of the machine for supporting the trough walls 61 and 62 from a frame cross member 68. Trough walls 63 are swingably mounted upon pivot pins 69 adjacent their opposite ends. At the feeding end of the machine the pins 69 are carried by brackets 71 depending from the frame cross member 65. Trough wall pivoting levers 72 are pivotally mounted upon the pins 69 and lower end portions 73 of these levers have the trough walls 63 fastened thereto by rivets 74. At the product discharge end of the machine the pins 69, mounted by brackets 71 on frame member 68, pivotally carry arms 75 to which the trough walls 63 are secured by rivets 76.

The upper ends of levers 72, FIGS. 3 and 5, are pivotally connected to a link 75a by pivot pins 76a. The link 75a has vertically spaced furcations 77 at its right end, FIG. 5, in which there is a pin 78 pivotally connecting with one end of a pitman rod 79. A headed bearing pin 81 having a horizontal axis pivotally connects the other end of the pitman rod 79 with one end of an operating lever 82, the left end thereof as shown in FIG. 2. This lever 82 is pivoted about a vertical axis in a pivot pin 83 therefor in a bracket 84 depending from the horizontal frame member 19. The right end of operating lever 82, FIG. 2, has a cam follower roller 85 journaled thereon in position to register with an annular cam 86 formed integrally with the gear 31, FIGS. 2 and 4. Cam 86 has two diametrically opposite cam lobes 87 each of 90 degrees duration. Each cam lobe has a rise ramp portion 88 associated therewith and a fall ramp portion 89. A spring 91, FIG. 5, connected between an ear 92 on the pitman rod 79 and an ear 93 on the frame leg 11 urges the trough wall pivoting levers 72 into their dot-dash line position shown in FIG. 5 and urges the cam-operated lever 82, FIG. 2 to pivot counter-clockwise about the pivot 83, as viewed from above, to maintain the cam follower roller 85 against the profile of the annular cam 86.

Power for rotating the bean feeding cylinder 28, the gear 31 and the cam 86 is received from an electric motor M, FIGS. 1 and 2, secured to the underside of the machine frame. A pulley 94 on the armature shaft 95 of motor M transmits driving force to a pulley 96 by means of a belt 97. Pulley 96 is fixed for rotation with a shaft 97a journalled in a bearing block 98 mounted on the horizontal frame member 19. Also journalled in the bearing block 98 is a shaft 99 on which there is mounted an idler gear 101 which meshes with and is driven by a gear 102 driven by the shaft 97a. Idler gear 101 meshes with and drives the large gear 31 with which the bean feeding cylinder 28 is constrained for rotation.

Immediately below the bean feeding cylinder 28 is a feed box 103 comprising a plurality feed passage partition plates 104, FIGS. 3 and 4. These plates 104 respectively align vertically with the annular ribs 41 of the bean feeding cylinder 28, and in their upper edges have large semi-circular notches 105 of slightly greater radius than the outer perimeters of the ribs 41 to partially embrace them. The left edges of the feed box partition plates 104 as seen in FIG. 3 are secured to an end wall 106 of the feed box 103 whereas the opposite ends of these plates are secured to an angle frame member 107. Feed passages 108 formed between the feed box partition plates 104 respectively register with the discharge passages 44 of the bean feeding cylinder and with the conveyor troughs TA, TB, TC and TD, as is ascertainable from FIG. 4. Feed box plates 104 which are in superposed proximity with the troughs TA, TB, TC and TD, cooperate with the feeding means ribs or plates 41 for arranging the beans to extend at least partially lengthwise of the troughs to facilitate the beans entering between the trough walls where the beans are engageable by the bean supporting and transfer surface 53 of the belt flight 52 for endwise transfer to the bean slitting means 47, FIG. 3.

The bean slitting means is carried by substantially identical skeleton frame structures 110 and 110a, FIGS. 2 and 3, secured together by transverse rods 111, 112 and 113 to form a slitting means frame 114. This frame 114 is mounted upon the product discharge end of the main frame F by a pair of brackets 115 and 115a mounted adjacent the ends of the rod 112 and secured to the transverse frame member 21 by cap screws 116. Additional mounting brackets 117 of which one is shown in FIG. 2 are secured respectively between the frame structure 110 and the leg 12 and between the frame structure 110a and the frame leg 13. A shaft 118 of the belt driving roller 48 extends between and is journalled at end portions thereof in the frame structures 110 and 110a. Two additional shafts, 119 and 112a, FIGS. 2, 3 and 6, extend between and are journalled in the frame structures 110 and 110a. Shaft 119 is journalled in bearings 111a whereas shaft 112a is journalled in bearings 113a.

Shaft 119 carries a disk knife mounting sleeve 114a for a bank of bean-slitting disk knives 121. This mounting sleeve has a central radial flange 124 containing a radial bore 123 in which there is a set screw 122 rotated into a threaded recess 125 in the shaft 119 to secure the sleeve for rotation with the shaft. One group of the disk knives 121 are slid onto the left end of the mounting sleeve 114a alternately with annular spacer members 126 and held in position between the flange 124 and a nut 127 turned on to the left end of the sleeve, FIG. 3. A second nut 127 on the right end of the sleeve 114a compresses a second group of the slitting knives 121 and their spacers 126 against the right end of the flange 124. The nuts 127 and the flange 124 grip the bank of slicing knives 121 to hold them non-rotatively with respect to the sleeve 114 wherefore these knives are caused to rotate with the shaft 119.

A bean slitting roller 128 which is complemental to the bank of slitting knives 121 is secured to the shaft 112a by a set screw 129. The cylindrical periphery of this roller is circumscribed by small annular bean-gripping ribs 131 between which there are annular grooves 132. Shafts 119 and 112a are in such proximity that the knives 121 extend into the grooves 132 as shown in FIG. 6. The circular periphery of the ribs 131 are serrated as illustrated in FIG. 7. Also the cutting edges of the disk knives 121 are serrated as shown in FIG. 7. In FIG. 7 it can be seen that the bank of knives 121 and the roller 128 form a bite 133 into which the beans are directed endwise, and the serrations upon the ribs 131 and upon the circular cutting edges of the knives 121 press into the beans and expedite pulling them endwise between the knives and the roller as they are cut into strips.

The axial spacing of the knives 121 corresponds to the spacing of the planes $P^1$ and $P^2$ illustrated by dot-dash lines in FIGS. 9, 10 and 11 where these planes are associated with beans B and $B^1$. Thus the knives are spaced in such manner as to make two parallel cuts lengthwise through a normal size bean. As the beans emerge from the discharge side of the bite between the bank of knives 121 and the complemental roller 128, they are also cut at a plane $P^3$ shown in FIGS. 10 and 11 which is at right angles to the planes $P^1$ and $P^2$. Such cutting of the beans at the plane $P^3$ is accomplished by a straight slitting knife 135, FIGS. 7 and 8. This knife occupies a plane parallel with the common principal axis of the disk knives and coincidently parallel with the longitudinal axes of the bean strips $S^1$, $S^2$, $S^3$, FIG. 10, as they emerge from the discharge side of the bite 133 to axially penetrate such strips at the plane $P^3$ for longitudinally slitting them into additional separate strips $S1a$, $S1b$, $S2a$, $S2b$, $S3a$ and $S3b$.

Also shown in FIG. 7 and in FIG. 3 is a bean stripper bar 136 extending between the frame structures 110 and 110a where it is held by cap screws 137. This bar has stripper members in the form of fingers 138 formed integrally therewith and extending between the disk knives 121 for deflecting the cut bean strips $S^1$, $S^2$, $S^3$, FIGS. 9 and 10, from between the knives 121 and guiding such strips into registration with the straight slitting knife 135 so that this knife is effective for further slitting these strips in the manner illustrated in FIG. 3 and at the plane $P^3$, FIG. 10.

In FIG. 8 it can be seen that the stripper bar 136 has knife holder members 138a mounted thereon by means of cap screws 139, there being two such cap screws associated with each of the members 138a. Holes, not shown, in the members 138a for the shanks of the cap screws 139 are oversize with respect to such shanks to facilitate spreading apart of the ends 141 of the members 138a to which opposite ends of the straight slitting knife 135 are secured by screws 142. Cap screws 143 threaded through holes 144 in the members 138a are adapted to bear against shoulders 145 of the bar 136 so that when these cap screws 143 are advanced into the holes 144 against these shoulders they can force the members 138a apart at their ends 141 for obtaining desired tensioning of the thin knife 135. Lock nuts 146 on the cap screws 143 maintain the desired adjustment. A center brace arm 147 for the knife 135 extends from the bar 136 into engagement with the knife. A slot, not shown, in the brace 147 receives the body of the knife 135. To enable the knife 135 to slice endwise through the bean slices $S^1$, $S^2$ and $S^3$ which are very slender and fragile, it is essential that the knife be so thin that it is flexible and incapable of self-support in a plane unless drawn taut by the knife holders 138a. The brace 147 supplements the holders 138a in maintaining the accurate position of the knife.

Power for driving the slitting roller 128 is received from the motor M, FIG. 2, by way of a pulley 151 on the motor armature shaft 95, a belt 152 and a pulley 153 on an end of the shaft 112a, FIGS. 2 and 6. Pulley 153 is secured to the shaft 112 by a set screw 154. A gear 155 is secured to the shaft 112 by a set screw 156, FIG. 6, and this gear meshes with a gear 157 which is secured to the disk knife driving shaft 119 by set screw 158. In FIGS. 6 and 1 the right end of the slitting knife shaft 119 can be seen to have a gear 159 mounted thereon by a set screw 161. This gear 159 provides drive to the conveyor belt driving drum shaft 118 through an idler gear 162, FIG. 1, and a gear 163 secured to the right end of the shaft 118, FIGS. 1 and 3.

Operation of the Machine

The machine is placed in operation by starting the electric motor M. Power from the motor for driving the feeding drum 28 is transmitted through an armature-mounted pulley 94, belt 97, pulley 96, gear 102, idler gear 101 and the gear 31 on the closed end of the cylinder 28. The motor is normally operated at such a speed that this drive for the bean feeding cylinder causes it to rotate at approximately 40 r.p.m. Power for driving the bean slitting drum 128 is transmitted from the motor through an armature shaft pulley 151, belt 152 and pulley 153, FIGS. 2 and 6, which is secured to one end of the drum driving shaft 112a by a set screw 154. Gears 155 and 157 respectively secured to the drum driving shaft 112a and to the disk knife driving shaft 119 transmit driving force from the shaft 112a to the bank of disk knives 121. A gear 159 on the right end of the knife bank driving shaft 119, FIGS. 1 and 6, transmits power to the driving roller 48 for the bean feeding belt 46 through an idler gear 162, FIG. 1, and a gear 163 secured to the shaft 118 upon which the belt driving drum 48 is secured. These driving trains between the motor M, the bean feeding cylinder 28, the bean slitting drum 128, the disk knives 121 and the driving roller 48 for the bean feeding belt 46, are so coordinated in driving speed ratio that when the feeding cylinder 28 is driven at 39 r.p.m., the feed belt 46 will rotate at a speed of 2150 feet per minute and the drum 128 and the slitting knives 121 will have a peripheral speed of 2590 feet per minute.

After the machine has been set in motion, green pod beans can be fed into the receiving hopper 24 where they will slide down the bottom wall 25 into the cylindrical vestibule 26 which rotates with the bean feeding cylinder 28 of which it is a part. The spiral impellers 45 inside the bean feeding cylinder 28 progress these beans from the vestibule into the circumferential ribbed portion of the cylinder where they are tumbled about and are permitted to feed downwardly from the cylinder through the annular discharge spaces 44 between the ribs 41. Since these discharge spaces 44 are of less width axially of the cylinder than the length of the beans, it is necessary that the beans approximately align themselves within planes parallel with the longitudinal axis of the feeding troughs TA, TB, TC and TD before they are discharged from the cylinder. The walls 108 of the feed box 103 cooperate with the annular ribs 41 of the feeding cylinder for arranging the beans to extend at least partially lengthwise of the troughs to facilitate their entering between the trough walls. This eliminates a bottleneck in the progress of the beans through the machine and enables the machine to operate at faster speed.

Beans entering the troughs TA, TB, TC and TD are quickly accelerated to the speed of the belt flight 52, which acceleration is expedited by the belt lugs 64. During movement of the beans in the troughs toward the slitting mechanism 47, these beans are swept laterally in the troughs to more nearly perfect their position of parallelism therewith. The trough walls 63 which are pivotally supported by pins 69 adjacent their upper edges constitute the means for laterally sweeping the beans. This lateral sweeping motion is imparted to the trough walls 63 by the diametrically opposite cam lobes 87 on the annular cam 86, FIGS. 2, 4 and 5, coaxial with and on the closed end of the bean feeding cylinder 28. When the cam follower roller 85, FIGS. 2 and 4, registers with the crest of either cam lobe 87 the lever 82 operated by the roller 85 will be pivoted in the position shown by the broken lines in FIG. 5 and to be operable through the pitman 79 and the link 75a to pivot the trough wall swinging levers 72 into their broken line positions. When the roller 85 is midway on either cam lobe ramp 88 or 89 the lever 82 will be pivoted in a position to cause the wall-swinging levers 72 and the trough walls 63 to be in an upright position midway between their associated trough walls 61 and 62. When the cam follower roller 85 is on a portion of the cam profile between the lobes 87, the lever 82 will be in the full line position shown in FIG. 5 as will the levers 72 and trough walls 63.

Since there are two of the cam lobes 87, the cyclical sweeping motion imparted to the trough walls 63 by these cam lobes incurs two complete excursive sweeping movements of the walls 63 alternately toward each of the walls 61 and 62 and back to a neutral position during each rotation of the feeding cylinder 28. This is at sufficient frequency for the walls 63 to impart an axially aligning sweeping motion to the beans as they are moved along the troughs toward the bean slitting means 47.

When the beans arrive at the disk slitting knives 121 where they are fed endwise into the bite between these knives and the ribs 131 of the roller 128, see FIGS. 3 and 7, two adjacent knives 121 will cut into the beans at parallel planes $P^1$ and $P^2$, FIGS. 9 and 10. The serrated ribs 131 meshing with serrated knife edges thus cutting into the beans will press the beans radially onto the knives to completely penetrate the beans by the knives as they pass through the bite 133. Since the peripheral speed of the knives 121 and the ribs 131 is slightly in excess of the speed at which the beans approach the bite 133 when these ribs and knives initially grasp the leading ends of the beans, such ends are quickly accelerated, causing the beans to swing their trailing ends of any that are out of the line of movement more proximately into such line of movement. While the beans are being cut by the knives 121 and as the leading ends of the beans emerge from the discharge side of the bite 133, these leading ends of the three initial strips $S^1$, $S^2$ and $S^3$, FIG. 10, are deflected from between the knives 121 by the stripper members or fingers 138, FIGS. 3, 7 and 8, so their longitudinal axes and the plane $P^3$ coincide with the plane of the straight flat slitting knife 135 which is effective for slitting the initially formed strip $S^1$ into further strips $S^{1a}$ and $S^{1b}$, the initially formed strip $S^2$ into the further strips $S^{2a}$ and $S^{2b}$ and the strip $S^3$ into the further strips $S^{3a}$ and $S^{3b}$.

The stripper fingers 138 are in such close proximity to the ribs 131 of the stripping roller 128 that these ribs press the bean strips $S^1$, $S^2$ and $S^3$ against the upper edges of the fingers 138 whereby these fingers and the serrated ribs 131 are cooperable in propelling the bean strips and guiding them accurately into the knife 135 so it can effectively cut these already extremely slender and frail strips $S^1$, $S^2$ and $S^3$ into the still narrower strips. The finished product may be discharged into a receptacle as that indicated at R in FIG. 3.

FIGS. 9 and 10 illustrate the association of planes $P^1$ and $P^2$ of disk knives 121 with a bean introduced to such knives while the major axis of the bean's transverse section is in an upright position. FIG. 11 illustrates a bean fragment with relation to the planes $P^1$ and $P^2$ when the bean is introduced endwise to the bean slicing knives while lying flat upon the conveyor belt, that is, with the minor axis of a cross-section thereof disposed vertically. The machine is adapted to operate upon the beans irrespective of their rotative position about their principal axes.

Having described a single preferred embodiment of the invention with the view of clearly and concisely illustrating the same, we claim:

1. In a slitting machine for green beans, bean feeding means, bean slitting means spaced from said feeding means and adapted to endwise slit beans fed endwise thereto into separate elongated strips, bean conveyor means comprising a bean supporting and transfer surface movable lengthwise of a median line from the feeding means to the slitting means, means for moving said surface, laterally-spaced conveyor trough walls extending parallel with the median line and projecting upward from contiguity with said surface to cooperate therewith in forming a bean conveyor trough extending from the feeding means toward the slitting means, means mounting the trough walls independently of the conveyor surface to adapt movement thereof relatively to such walls, the lateral spacing of said walls being substantially less than the length of the beans wherefore it is imperative that the beans be arranged at less than 90 degrees transversely of the trough walls to enter such trough, the feeding means being operable to feed beans into said trough, and means disposed in superposed proximity with the trough for arranging the beans to extend at least partially lengthwise thereof to facilitate their entering between the trough walls, said bean feeding means comprising a bean-feeding cylinder above the conveyor means bean supporting and transfer surface and rotatable about a horizontal axis disposed transversely of such surface, the cylinder having a side wall of circumferential ribs spaced apart axially of such cylinder to form bean discharge spaces therebetween into which beans tumbled within the rotating cylinder are received when orientated into planes substantially perpendicular to the cylinder axis and through which the orientated beans are dischargeable downwardly from the cylinder toward the bean supporting and transfer surface.

2. The combination set forth in claim 1 wherein the means disposed in superposed proximity with the trough is interposed between the cylinder and the bean conveyor means and comprises feed passage partition plates parallel with the cylinder wall ribs and with the conveyor trough walls, and said partition plates being laterally spaced to align vertically respectively with the ribs and the trough walls to maintain the orientation of the beans while directing them into the trough.

3. The combination set forth in claim 2, wherein said means mounting the trough walls facilitates relative lateral movement of such trough walls to change the width of the troughs, and wherein there is means for cyclically effecting such lateral movement to alternately narrow and widen said troughs.

4. In a slitting machine for green beans, bean feeding means comprising a hopper for receiving a relatively large quantity of green beans, said hopper having a horizontally opening discharge vestibule, and a bean-feeding cylinder disposed for rotation about a horizontal axis and in cooperation with said discharge vestibule so that said green beans are horizontally movable from said discharge vestibule into said cylinder, impeller means carried in said cylinder and extending into said vestibule for sweeping said green beans into said cylinder attendant to the rotation of said cylinder, said cylinder being formed to have openings therethrough of a size and position for dropping green beans therefrom with said green beans disposed substantailly along axes perpendicular to the axis of rotation of said cylinder, means for rotating said cylinder at a certain speed, bean conveyor means disposed below said cylinder for receiving green beans dropped from said cylinder and operable to convey said green beans therealong with the longitudinal axes of said green beans disposed substantailly parallel to the direction said green beans are conveyed, means for operating said conveyor means at a speed related to said certain speed so that said green beans received from said cylinder are accelerated to a speed so that said green beans are conveyed from said cylinder at a rate more rapid than they are fed thereto, and bean slitting means disposed in cooperation with said bean conveyor means for receiving said green beans substantailly endwise from said conveyor means and operable to simultaneously carry said green beans therethrough and slit said green beans along the longitudinal axes thereof, and means for operating said slitting means at a speed related to the speed of said green beans on said conveyor means so that said green beans are accelerated in passing through said slitting means.

5. In a slitting machine for green beans as claimed in claim 4, wherein said slitting means is formed to slit each green bean substantailly along two planes equally spaced and parallel to the longitudinal axes of said green beans.

6. In a slitting machine for green beans as claimed in claim 4, wherein said slitting means is formed to slit each bean at least along two substantailly perpendicular planes parallel to the longitudinal axes of said green beans.

7. In a slitting machine for green beans as claimed in claim 4, wherein said slitting means comprises a series of contra-rotating partially intermeshing cutting disks and a fixed cutting blade disposed in a plane substantially tangent to the line of intermeshing of said cutting disks.

8. In a slitting machine for green beans as claimed in claim 7, wherein the speed of rotation of said cutting disks is sufficiently high to project said green beans onto said fixed cutting blade with a force sufficient to cause slitting of said green beans without bending along a longitudinal axis thereof.

9. In a slitting machine for green beans as claimed in claim 7, wherein said cutting disks are rotated at substantially the same peripheral speeds.

10. In a slitting machine for green beans, bean feeding means comprising a hopper for receiving a relatively large quantity of green beans, said hopper having a horizontally opening discharge vestibule, and a bean feeding cylinder disposed for rotation about a horizontal axis and in cooperation with said discharge vestibule so that said green beans are horizontally movable from said discharge vestibule into said cylinder, impeller means carried in said cylinder and extending into said vestibule for sweeping said green beans into said cylinder attendant to the rotation of said cylinder, said cylinder being formed to have openings therethrough of a size and position for dropping green beans therefrom with said green beans disposed substantailly along axes perpendicular to the axis of rotation of said cylinder, means for rotating said cylinder at a certain speed, bean conveyor means disposed below said cylinder for receiving green beans dropped from said cylinder and operable to convey said green beans therealong, means for operating said conveyor means at a speed related to said certain speed so that said green beans received from said cylinder are accelerated to a speed so that said green beans are conveyed from said cylinder at a rate more rapid than they are fed thereto, a plurality of trough walls secured immediately above said conveyor means and positioned substantially parallel to the direction of movement of said conveyor means and in cooperation with said openings in said cylinder so that green beans dropped from said cylinder are directed and maintained between said trough walls on said conveyor means with the longitudinal axes of said green beans disposed substantailly parallel to the direction of movement of said conveyor means, and bean slitting means disposed in cooperation with said trough walls and said bean conveyor means for receiving said green beans substantailly endwise from said conveyor means and operable to simultaneously carry said green beans therethrough and slit said green beans along the longitudinal axes thereof, and means for operating said slitting means at a speed related to the speed of said green beans on said conveyor means so that said green beans are accelerated in passing through said slitting means.

11. In a slitting machine for green beans as claimed in claim 10, wherein certain of the intermediate trough walls of said plurality of trough walls are movable alternately toward and away from the other trough walls to sweep said green beans moving on said conveyor means laterally thereon to substantailly straighten said green beans into substantial parallelism with said trough walls.

12. In a slitting machine for green beans as claimed in claim 11, wherein means for moving said movable trough walls is provided and comprises a cam follower member connected to said movable trough walls for moving said trough walls responsive to the movement of said cam follower, and a plurality of cam profiles carried on said cylinder and cooperating with said cam follower to move said cam follower responsive to the rotation of said cylinder.

13. Bean feeding and conveying mechanism, comprising a bean-feeding cylinder rotatable about a horizontally-extending axis, said cylinder having a bean-receiving opening within an end thereof and having a side wall of circumferential ribs spaced apart axially of such cylinder to form a plurality of axially-spaced bean discharge spaces into which beans tumbled within the rotating cylinder are received when orientated into planes substantially perpendicular to the cylinder axis and through which such orientated beans are discharged downwardly from the cylinder, bean conveyor means including a horizontally extending bean supporting and transfer surface disposed beneath the cylinder, said surface being movable horizontally along a median line extending substantially parallel with the planes of orientation for the beans descending from the cylinder, laterally-spaced conveyor trough walls extending parallel with the median line and projecting upward from contiguity with the conveyor means surface to cooperate therewith in forming adjacent parallel conveyor troughs separated by an intermediate one of said trough walls common thereto, said troughs being beneath respective of the cylinder side wall discharge spaces to receive the beans respectively therefrom, means mounting the trough walls independently of the bean supporting and transfer surface to facilitate movement of such surface relatively thereto, the means in support of the intermediate wall being accommodative of movement of such wall alternately toward the walls at opposite sides thereof to alternately narrow and widen the adjacent troughs to laterally sweep the beans therein into nearer parallelism with the troughs, and means for imparting such alternate movement to the intermediate wall.

14. The combination set forth in claim 13, wherein the means for supporting the intermediate trough wall comprises pivot means establishing a fixed pivot axis adjacent an upper edge of such wall to facilitate swinging of the lower edge of such wall laterally back and forth adjacent the bean supporting and transfer surface while the upper edge remains substantially in vertical alignment with a rib of the cylinder between side wall feeding spaces through which beans are respectively discharged into the troughs.

15. The combination set forth in claim 13, wherein there is a feed box disposed between the lower side of the feeding cylinder and the trough walls, said feed box comprising a plurality of partition walls extending upwardly from respective of the trough walls to respective of the feeding cylinder ribs, and said partition walls having upper edges containing semicircular notches partially embracing their associated ribs circumferentially of the cylinder.

References Cited in the file of this patent

UNITED STATES PATENTS

| | | |
|---|---|---|
| 1,710,421 | Jorgenson | Apr. 23, 1929 |
| 2,705,960 | Stelter | Apr. 12, 1955 |
| 2,758,697 | Schultz | Aug. 14, 1956 |
| 2,923,337 | Jouin | Feb. 2, 1960 |